(12) United States Patent
Zhao et al.

(10) Patent No.: US 8,729,819 B2
(45) Date of Patent: May 20, 2014

(54) MULTI-OUTPUT CURRENT-BALANCING CIRCUIT

(71) Applicant: Silergy Semiconductor Technology (Hangzhou) LTD, Hangzhou (CN)

(72) Inventors: Chen Zhao, Hangzhou (CN); Feng Yu, Hangzhou (CN)

(73) Assignee: Silergy Semiconductor Technology (Hangzhou) Ltd., Hang Zhou (CN)

( * ) Notice: Subject to any disclaimer, the term of this patent is extended or adjusted under 35 U.S.C. 154(b) by 0 days.

(21) Appl. No.: 13/743,184

(22) Filed: Jan. 16, 2013

(65) Prior Publication Data

US 2013/0207560 A1 Aug. 15, 2013

(30) Foreign Application Priority Data

Feb. 15, 2012 (CN) .......................... 2012 1 0032720

(51) Int. Cl.
*H05B 41/16* (2006.01)
(52) U.S. Cl.
USPC ........ 315/282; 315/274; 315/185 S; 315/312; 315/209 R
(58) Field of Classification Search
USPC ....... 315/274–289, 224, 247, 185 S, 312–326
See application file for complete search history.

(56) References Cited

U.S. PATENT DOCUMENTS

| | | | | |
|---|---|---|---|---|
| 4,322,817 | A * | 3/1982 | Kuster | 363/26 |
| 8,080,947 | B2 * | 12/2011 | Chang et al. | 315/282 |
| 8,531,125 | B2 * | 9/2013 | Kim et al. | 315/279 |
| 2012/0286678 | A1 | 11/2012 | Wu | |
| 2012/0293080 | A1 | 11/2012 | Ying | |

* cited by examiner

*Primary Examiner* — Tuyet Thi Vo
(74) *Attorney, Agent, or Firm* — Michael C. Stephens, Jr.

(57) ABSTRACT

The present invention relates to a multi-output current-balancing circuit, which in one embodiment can include: (i) a transformer having a primary winding and a plurality of secondary windings, where the primary winding receives an AC input current; (ii) a plurality of first and second rectifier circuits and a plurality of first current balancing components, where each of the first and second rectifier circuits and the first current balancing components is coupled to a corresponding secondary winding, where each the first current balancing component is configured for current balancing between each of the first and second rectifier circuits of the corresponding secondary winding; and (iii) at least one second current balancing component, where each second current balancing component is coupled to a pair of the second rectifier circuits that correspond to different secondary windings, where the second current balancing components are configured for current balancing between different the secondary windings.

8 Claims, 5 Drawing Sheets

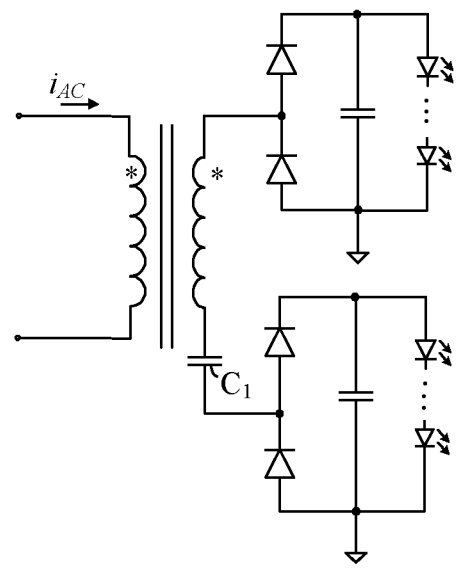
FIG. 1 (conventional)

MULTI-OUTPUT CURRENT-BALANCING CIRCUIT

RELATED APPLICATIONS

This application claims the benefit of Chinese Patent Application No. 201210032720.7, filed on Feb. 15, 2012, which is incorporated herein by reference in its entirety.

FIELD OF THE INVENTION

The present invention relates to a multi-output circuit, and more specifically to a multi-output current-balancing circuit.

BACKGROUND

Light-emitting diodes (LEDs) may be assembled in high-efficiency and high-brightness lighting applications. The brightness of LEDs may directly relate to forward current flowing through the LEDs. In general, the LEDs become brighter as the forward current increases. Usually, the forward current should be precisely balanced in order to obtain brightness balancing between a plurality of LEDs. Typically, an LLC resonant DC/DC converter is used in LED drivers because of its high conversion efficiency. As shown in FIG. 1, an example LLC resonant DC/DC converter can include two rectifier loops connected with the secondary winding. This approach can achieve current balancing without any active component or active controlling methods, but only through blocking capacitor $C_1$.

However, a converter of this kind can only achieve current balancing between two LED strings. When a plurality of LEDs are connected in series to form an LED string, the cross voltage on each LED strings may be too high and result in an increase of a withstand voltage of the LED string. Also, forward voltage drops on diodes with high withstand voltages can be substantially large, so conduction losses and reverse recovery losses cannot be ignored. Therefore, it may become difficult to improve system conversion efficiency, and design and production costs may be increased due to relatively large bulk capacitors configured as filter capacitors.

SUMMARY

In one embodiment, a multi-output current-balancing circuit can include: (i) a transformer having a primary winding and a plurality of secondary windings, where the primary winding receives an AC input current; (ii) a plurality of first and second rectifier circuits and a plurality of first current balancing components, where each of the first and second rectifier circuits and the first current balancing components is coupled to a corresponding secondary winding, where each first current balancing component is configured for current balancing between each of the first and second rectifier circuits of the corresponding secondary winding; and (iii) at least one second current balancing component, where each second current balancing component is coupled to a pair of the second rectifier circuits that correspond to different secondary windings, where the second current balancing components are configured for current balancing between different the secondary windings.

Embodiments of the present invention can advantageously provide several advantages over conventional approaches. For example, a multi-output current-balancing circuit can be used in the applications of multi-winding on the secondary side, and current balancing between multi-output circuits can be achieved through current balancing components. Even in the high power applications, rectifier diodes of relatively low withstand voltages and relatively small bulk filter capacitors can also meet system requirements, and the system conversion efficiency can be increased. Also, product cost and circuit volume can be reduced, facilitating design and simplifying circuit structure. In addition, multi-output current-balancing circuits can be suitable for applications that use a plurality of substantially equal currents, and are particularly suitable for multi-output LED drivers. Other advantages of the present invention may become readily apparent from the detailed description of preferred embodiments below.

BRIEF DESCRIPTION OF THE DRAWINGS

FIG. 1 shows a schematic diagram of an example conventional two-output current balancing circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 2:
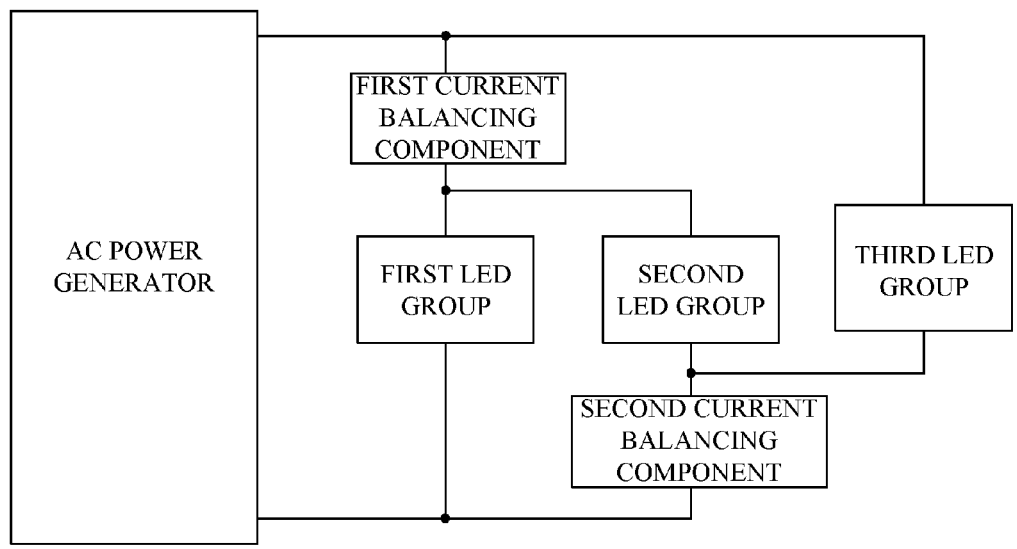
FIG. 2 shows a schematic diagram of an example multi-output current balancing circuit.

In order to accommodate more than one light-emitting diode (LED) group or string of a plurality of LEDs, a multi-output current balancing circuit as shown in FIG. 2 can be used. In this example, a first current balancing component can balance currents respectively flowing through a first LED group and a second LED group. Also, a second current balancing component can be used to balance currents respectively flowing through the second LED group and a third LED group.

Figure 3:
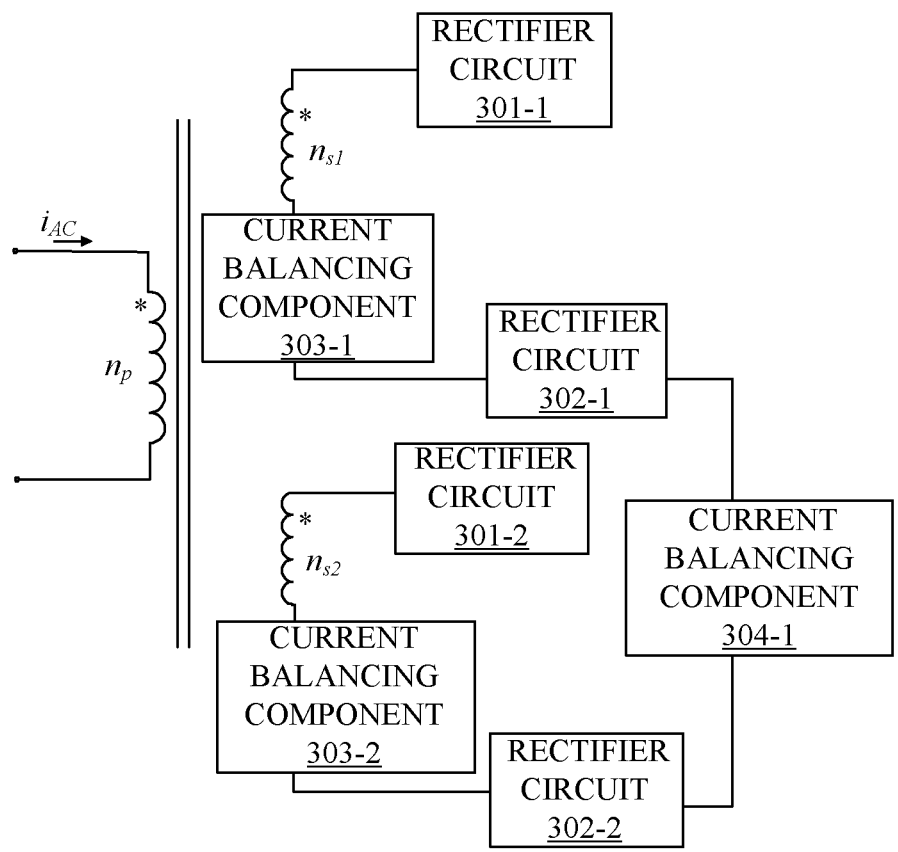
FIG. 3 is a schematic diagram of a first example multi-output current-balancing circuit according to embodiments of the present invention.

Referring now to FIG. 3, shown is a schematic diagram of a first example multi-output current-balancing circuit according to embodiments of the present invention. In this example, rectifier circuits 301 can be first rectifier circuits, rectifier circuits 302 can be second rectifier circuits, current balancing components 303 can be first current balancing components, and current balancing component 304 can be a second current balancing component. Of course, other numbers and configurations of current balancing components (e.g., greater than two) and rectifier circuits (e.g., greater than two) can also be accommodated in particular embodiments.

The particular multi-output current-balancing circuit of FIG. 3 can include a transformer, where the transformer can include primary winding $n_p$ and two secondary windings $n_{s1}$ and $n_{s2}$. Primary winding $n_p$ can be used to receive an AC input current, secondary winding $n_{s1}$ can be used to supply power to rectifier circuits 301-1 and 302-1, and secondary winding $n_{s2}$ can be used to supply power to rectifier circuits 301-2 and 302-2. The output terminals of rectifier circuits 301 and 302 can be configured as four output terminals of the multi-output current-balancing circuit.

Current balancing component 303-1 can connect with secondary winding $n_{s1}$, and may be used to balance the currents of rectifier circuits 301-1 and 302-1. Similarly, current balancing component 303-2 can connect with secondary winding $n_{s2}$, and may be used to balance the currents of rectifier circuits 301-2 and 302-2. Rectifier circuit 302-1 corresponding to secondary windings $n_{s1}$ and rectifier circuit 302-2 corresponding to secondary windings $n_{s2}$ can be coupled together through current balancing component 304-1. For example, current balancing component 304-1 can be used to balance the currents of secondary windings $n_{s1}$ and $n_{s2}$.

With the current balancing components 303 and 304-1, current balancing between multi-output channels of the multi-output current-balancing circuit can be accommodated. Also, while only two secondary windings are shown in this particular example, certain embodiments can also support more than two (e.g., three, four, etc.) secondary windings. For example, each such secondary winding can be mapped to a current balancing component 303 and rectifier circuits 301 and 302. Further, current balancing components 304 can be utilized to couple rectifier circuits 302 that correspond to different secondary windings.

Figure 4:
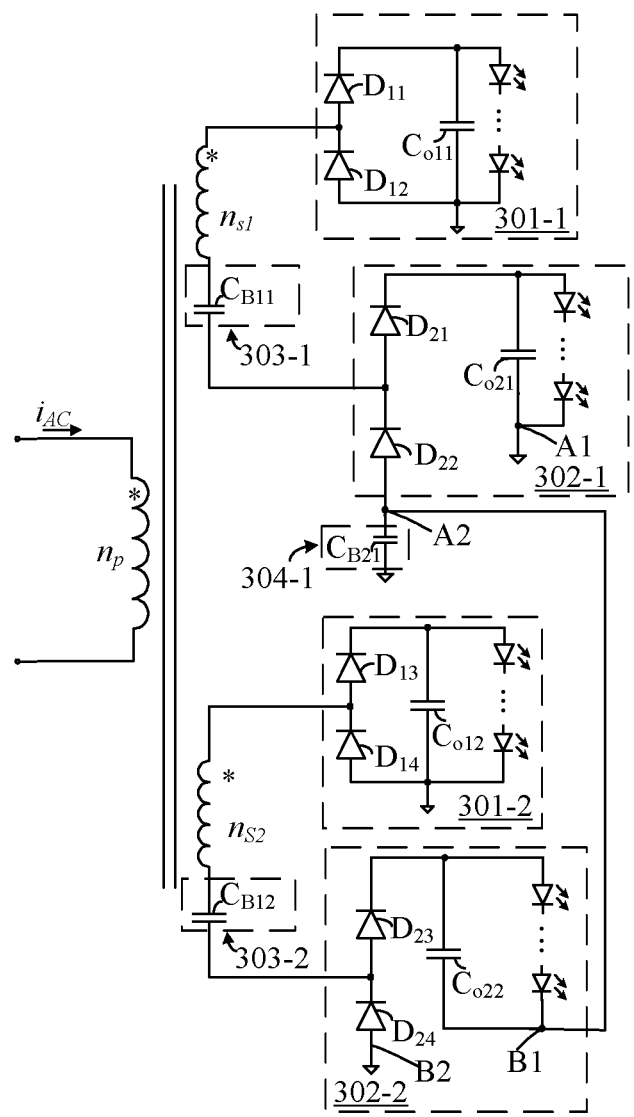
FIG. 4 is a schematic diagram of a second example multi-output current-balancing circuit according to embodiments of the present invention.

Referring now to FIG. 4, shown is a schematic diagram of a second example multi-output current-balancing circuit according to embodiments of the present invention. In FIG. 4, current balancing component 303-1 can include current balancing capacitor $C_{B11}$, current balancing component 303-2 can include current balancing capacitor $C_{B12}$, and current balancing component 304-1 can include current balancing capacitor $C_{B21}$. Rectifier circuit 301-1 can include diode $D_{11}$, diode $D_{12}$, and filter capacitor $C_{o11}$. For example, diode $D_{11}$ can be series connected with diode $D_{12}$, and filter capacitor $C_{o11}$ can be connected in parallel to the cathode of diode $D_{11}$ and the anode of diode $D_{12}$.

A common junction of diode $D_{11}$ and diode $D_{12}$ can be configured as an input terminal of rectifier circuit 301-1, and two terminals of filter capacitor $C_{o11}$ can be configured as output terminals of rectifier circuit 301-1. Rectifier circuit 302-1 can include diode $D_{21}$, diode $D_{22}$, and filter capacitor $C_{o21}$. For example, diode $D_{21}$ can be series connected to diode $D_{22}$, and filter capacitor $C_{o21}$ can be connected in parallel to the cathode of diode $D_{21}$ and the anode of diode $D_{22}$. The second terminal of filter capacitor $C_{o21}$ can connect to terminal A1 of rectifier circuit 302-1, and the anode of diode $D_{22}$ can connect terminal A2 of rectifier circuit 302-1.

A common junction of diode $D_{21}$ and diode $D_{22}$ can be configured as an input terminal of rectifier circuit 302-1, and two terminals of filter capacitor $C_{o21}$ can be configured as output terminals of rectifier circuit 302-1. The configuration and connection of, rectifier circuit 301-2, rectifier circuit 302-2, and current balancing component 303-2 corresponding to secondary winding $n_{s2}$ can be the same or similar to rectifier circuit 301-1, rectifier circuit 302-1, and current balancing component 303-1 corresponding to secondary winding $n_{s1}$.

Connection terminal A1 of rectifier circuit 302-1 and connection terminal B2 of rectifier circuit 302-2 can connect to ground. Connection terminal A2 of rectifier circuit 302-1 can connect to connection terminal B1 of rectifier circuit 302-2. The common junction of rectifier circuits 302-1 and 302-2 can connect to one terminal of current balancing capacitor $C_{B21}$, and the other terminal of current balancing capacitor $C_{B21}$ can connect to ground.

To facilitate the description, based on the illustration of FIG. 3, diodes $D_{11}$ and diode $D_{13}$ can each be a first diode, while diode $D_{12}$ and diode $D_{14}$ can each be collectively a second diode. Also, each of diode $D_{21}$ and diode $D_{23}$ can be a third diode, while each of diode $D_{22}$ and diode $D_{24}$ can be a fourth diode. Current balancing capacitor $C_{B11}$ and current balancing capacitor $C_{B12}$ can each be a first current balancing capacitor, and current balancing capacitor $C_{B21}$ can be a second current balancing capacitor. Each of filter capacitor $C_{o11}$ and filter capacitor $C_{o12}$ can be a first filter capacitor, and filter capacitor $C_{o21}$ and filter capacitor $C_{o22}$ can each be a second filter capacitor. Also, connection terminal A1 and connection terminal B1 can each be a first connection terminal, and connection terminal A2 and connection terminal B2 can be a second connection terminal. Of course, other numbers and configurations of diodes, capacitors, current balancing components, connection terminals, etc., can also be accommodated in particular embodiments.

Based on the ampere-second property of a capacitor, at steady state, the average currents of the first current balancing capacitors and the second current balancing capacitor can be substantially zero. That is, the forward currents flowing through the first current balancing capacitors and the second current balancing capacitor can be substantially equal to the reverse currents thereof. In this way, the first current balancing capacitors can balance the currents between a first rectifier circuit and a second rectifier circuit corresponding to the same secondary winding. Also, a second current balancing capacitor can balance the currents between two different secondary windings, and as a result current balancing between multi-output current-balancing circuits can be achieved.

From the above description, the multi-output current-balancing circuits according to embodiments of the present invention can realize current balancing between multi-output channels based on the self-property of current balancing components. Even in high power applications, rectifier diodes of relatively low withstand voltages and filter capacitors of relatively small bulk can be used to meet the application requirements. The system conversion efficiency can also be increased, and product costs and circuit volume can be reduced to facilitate the overall design.

The example shown in FIG. 4 may still take two secondary windings as an example to explain connections and operating principles of a multi-output current-balancing circuit in particular embodiments. Particular embodiments can also support a multi-output current-balancing circuit with more than two secondary windings. Further, connection relationships between such secondary windings and corresponding first current balancing components, first and second rectifier circuits, etc., may not be limited to the particular forms shown in FIG. 3 and FIG. 4.

Figure 5:
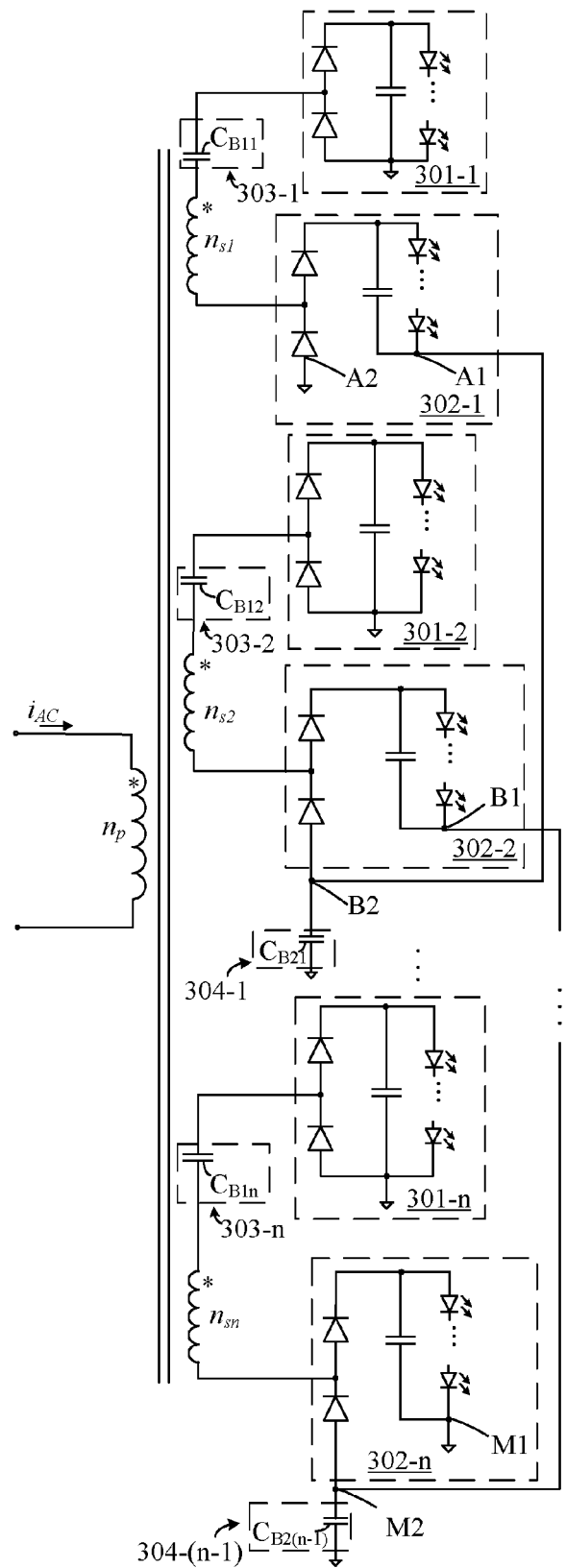
FIG. 5 is a schematic diagram of a third example multi-output current-balancing circuit according to embodiments of the present invention.

Referring now to FIG. 5, shown is a third example multi-output current-balancing circuit according to embodiments of the present invention. In this particular example, the secondary windings can be denoted by $n_{s1}, n_{s2}, \ldots n_{sn}$ different from the examples shown in FIG. 3 and FIG. 4, the first output terminals of secondary windings $n_{s1}, n_{s2}, \ldots n_{sn}$ can be connected to one terminals of current balancing capacitors $C_{B11}, C_{B12}, \ldots C_{B1n}$, and the other terminals of current balancing capacitors $C_{B11}, C_{B12}, \ldots C_{B1n}$ can be connected to the corresponding rectifier circuits 301-1, 301-2, . . . 301-n.

Connection terminal A1 of rectifier circuit 302-1 corresponding to secondary winding $n_{s1}$ can connect to connection terminal B2 of rectifier circuit 302-2 corresponding to second winding $n_{s2}$. Also, a common junction of connection terminal A1 and connection terminal B2 can connect to one terminal of current balancing capacitor $C_{B21}$, while the other terminal of current balancing capacitor $C_{B21}$ can connect to ground. Similarly, connection terminal M2 of rectifier circuit 302-n corresponding to secondary winding $n_{sn}$ can connect to a rectifier circuit corresponding to the adjacent secondary winding, and the common junction thereof can connect to one terminal of current balancing capacitor $C_{B2(n-1)}$.

With respect to the above connection relationship, connection terminal A2 of rectifier circuit 302-1 corresponding to secondary winding $n_{s1}$ and connection terminal M1 of rectifier circuit 302-n corresponding to secondary winding $n_{sn}$ can be connected to ground. Also, in the example current balancing circuit shown in FIGS. 4 and 5, each of the loads connected to the multi-output channels can be include one or more series connected LEDs. Further, any suitable loads can be coupled to the multi-output channels, particularly such loads as may require substantially balanced current.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multi-output current-balancing circuit, comprising:
   a) a transformer having a primary winding and a plurality of secondary windings, wherein said primary winding is configured to receive an AC input current;
   b) a plurality of first rectifier circuits, a plurality of second rectifier circuits, and a plurality of first current balancing components, wherein each of said first and second rectifier circuits and said first current balancing components is coupled to a corresponding one of said plurality of secondary windings, wherein each said first current balancing component is configured for current balancing between each of said first and second rectifier circuits of said corresponding secondary winding; and
   c) at least one second current balancing component, wherein each second current balancing component is coupled to a pair of said second rectifier circuits that correspond to different secondary windings, wherein said second current balancing components are configured for current balancing between different said secondary windings.

2. The current-balancing circuit of claim 1, wherein each of said secondary windings is configured to supply power to said corresponding first and second rectifier circuits.

3. The current-balancing circuit of claim 1, wherein output terminals of said first and second rectifier circuits are configured to be output terminals of said current-balancing circuit.

4. The current-balancing circuit of claim 1, wherein each of said first current balancing components comprises a first current balancing capacitor.

5. The current-balancing circuit of claim 1, wherein each of said second current balancing components comprises a second current balancing capacitor, wherein a first terminal of said second current balancing capacitor is coupled to said pair of said second rectifier circuits that correspond to different secondary windings, and a second terminal of said second current balancing capacitor is coupled to ground.

6. The current-balancing circuit of claim 1, wherein each of said first rectifier circuits comprises a first diode, a second diode, and a first filter capacitor, wherein said first diode is coupled series to said second diode, and said first filter capacitor is coupled in parallel to terminals of said first diode and said second diode, wherein a cathode of said second diode is coupled to ground, wherein a common junction of said first and second diodes is configured as an input terminal of said first rectifier circuit, and terminals of said first filter capacitor are configured as output terminals of said first rectifier circuit.

7. The current-balancing circuit of claim 1, wherein each of said second rectifier circuits comprises a third diode, a fourth diode, and a second filter capacitor, wherein said third diode is coupled in series to said fourth diode, wherein a cathode of said third diode is coupled to a first terminal of said second filter capacitor, wherein a second terminal of said second filter capacitor is configured as a first connection terminal of said second rectifier circuit, and an anode of said fourth diode is configured as a second connection terminal of said second rectifier circuit, wherein a common junction of said third and fourth diodes is configured as an input terminal of said second rectifier circuit, and two terminals of said second filter capacitor are configured as output terminals of said second rectifier circuit, wherein said second rectifier circuits corresponding to different secondary windings are coupled through said first and second connection terminals, and common junctions of said second rectifier circuits are coupled to said second current balancing components.

8. The current-balancing circuit of claim 1, further comprising a load coupled to each multi-output channel of said current-balancing circuit, wherein each load comprises one or more series coupled light-emitting diodes (LEDs).

* * * * *